United States Patent Office 2,832,492
Patented Apr. 29, 1958

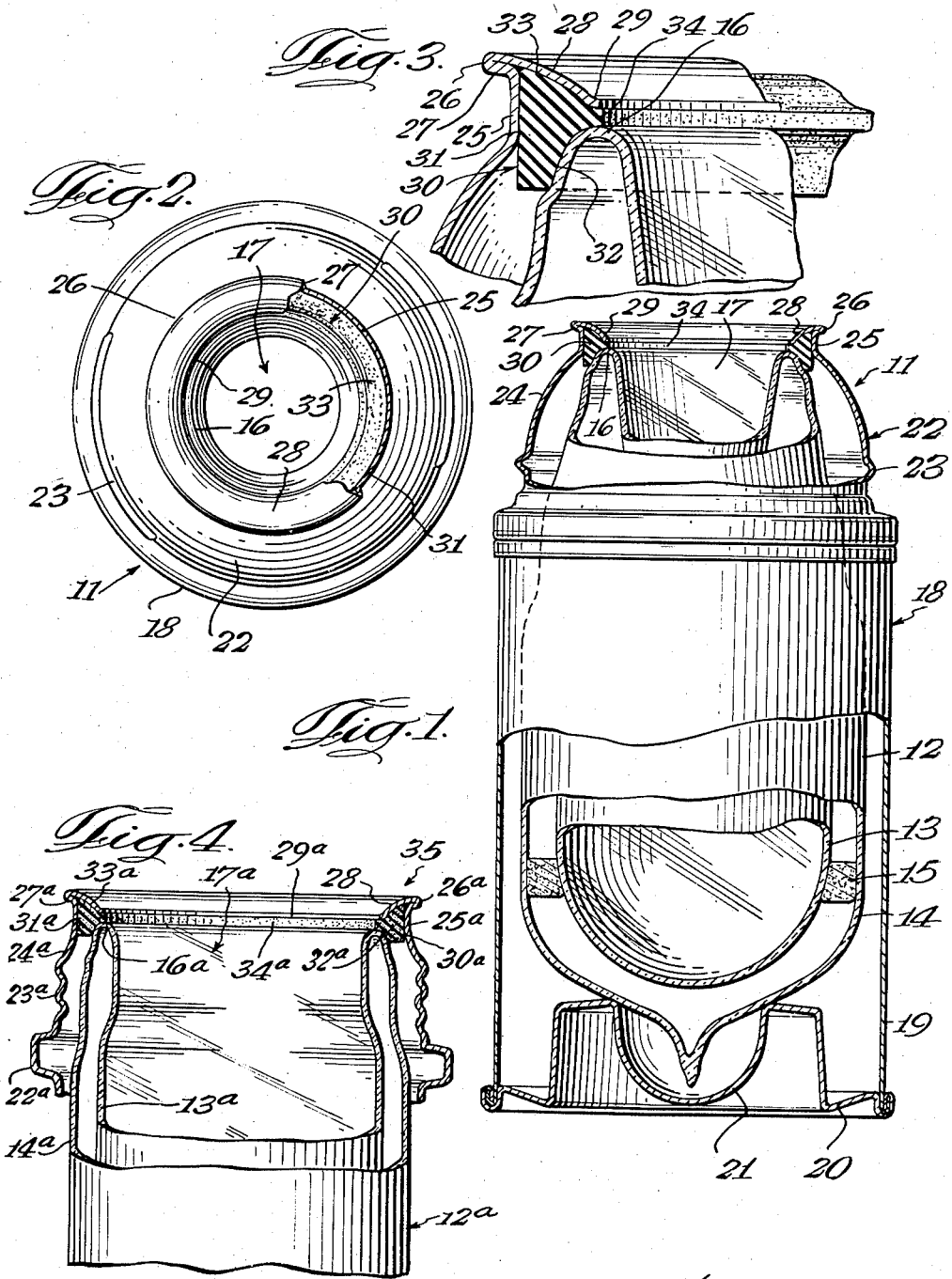

2,832,492

VACUUM BOTTLE HAVING POURING LIP

Carl Bramming, Nashville, Tenn., assignor to Aladdin Industries, Incorporated, Nashville, Tenn., a corporation of Illinois Application December 6, 1954, Serial No. 473,082

3 Claims. (Cl. 215—13)

This invention relates to vacuum bottles and particularly to a new and improved pouring lip construction which may be embodied in a vacuum bottle or the like.

One principal object of the present invention is to provide a new and improved vacuum bottle having an annular pouring lip which is formed integrally with the upper element of the protective jacket for the vacuum bottle.

A further object is to provide a vacuum bottle of the foregoing character which is equipped with means adapted to form a seal between the pouring lip and the double walled vacuum insulated receptacle or liner of the vacuum bottle.

It is another object of the invention to provide a new and improved pouring lip construction which effectively prevents the fluid being poured from the vacuum bottle from running down or dripping onto the outside of the protective jacket.

A further object is to provide a pouring lip construction which not only is highly effective but also is easily cleaned and sanitary.

Another object is to provide a pouring lip construction which is low in cost and easily manufactured.

Furthr eobjects and advantages of the invention will appear from the following description taken with the accompanying drawings, in which:

Figure 1 is an elevational view of an exemplary vacuum bottle constituting an illustrative embodiment of the invention, the view being partly in longitudinal cross-section.

Figure 2 is a top view of the vacuum bottle with a portion of the pouring lip broken away to reveal a portion of the sealing gasket embodied in the vacuum bottle.

Figure 3 is a fragmentary enlarged elevational sectional view illustrating the pouring lip construction.

Figure 4 is a fragmentary elevational sectional view of a modified vacuum bottle embodying the invention, the modified bottle being relatively wide mouthed, while the bottle on Figs. 1–3 is relatively narrow mouthed.

If Figs. 1–3 of the drawings are considered in greater detail, it will be seen that they illustrate an exemplary vacuum bottle 11, comprising a glass double walled vacuum insulated receptacle or liner 12 of the usual type. It will be seen that the vacuum insulated receptacle 12 is provided with inner and outer shells or walls 13 and 14 spaced by a plurality of pads 15, the walls being joined at their upper ends to form a rounded annular top edge 16. An open mouth 17 is defined within the perimeter of the top edge 16. In this instance the mouth 17 is of conventional narrow form, but the invention may be applied equally well to a wide mouthed type of vacuum bottle, as shown in Fig. 4.

The vacuum insulated receptacle 12 is received within a protective jacket or casing 18 which may be made of metal, plastics or other suitable materials. In this instance the jacket 18 is made of metal and is formed with a cylindrical outside wall 19, closed at one end by a bottom wall 20 having a flexible, resilient central portion 21 adapted to support the fragile receptacle or liner 14.

The jacket 18 is provided with an upper end portion which may be formed integrally with the jacket 18 but preferably is formed as a detachable annular collar 22, made of thin sheet metal as shown. External threads 23 are formed on the lower end portion of the collar 22 for receiving a cup (not shown) adapted to cover the upper end of the vacuum bottle 11.

It will be seen that the collar 22 has an upwardly tapering wall portion 24 extending between the cup receiving threads 23 and a narrow generally cylindrical portion 25 having its lower end at the general level of the top edge 16 on the vacuum insulated receptacle 12. To form one element of a pouring lip 26, the cylindrical wall element 25 is surmounted with an outwardly flaring integral flange 27. Above the flange 27 the wall of the collar 22 is folded inwardly to define an inwardly and downwardly extending flange 28. Thus the collar 22 is folded double at the pouring lip 26. The downwardly extending flange 28 terminates in an annular edge 29 which closely overlies the rounded top edge 16 of the vacuum insulated receptacle 12. It will be seen that the inner edge portion 29 is in the form of a narrow annular generally horizontal ledge. Between the inner edge portion 29 and the folded pouring lip 26, the illustrated flange 28 arches upwardly and outwardly, the top surface of the flange 28 being of convex form.

To prevent fluid from passing between the vacuum insulated receptacle 12 and the protective casing 18, a gasket ring 30 is seated between the upper end of the collar 22 and the rounded upper end of the receptacle 12. The gasket 30 is preferably made of synthetic rubber or some other soft, resilient rubberlike material, such as natural rubber or various plastics.

In order to center the vacuum insulated receptacle 12 relative to the casing 18, the annular gasket 30 is formed with a generally cylindrical outer surface 31 which is snugly received within the cylindrical wall element 25 of the collar 22. The gasket 30 has an inwardly and downwardly facing surface 32 which seats against the upper end of the vacuum insulated receptacle 12. It will be seen that the surface 32 fits around and is concavely curved to conform in shape to the outside of the rounded top edge 16 on the receptacle 12. Thus the surface 32 is of upwardly and inwardly arching form.

To provide an effective seal with the collar 22, the gasket 30 is provided with an arching upwardly facing annular surface 33 which fits under and is conformed in shape to the shoulder defined by the lower surface of the arching flange 28 on the collar. It will be seen that the gasket 30 tapers inwardly to a relatively thin inner portion 34 disposed between the inner edge portion 29 of the collar 22 and the rounded top edge 16 of the vacuum insulated receptacle 12.

With the vacuum bottle fully assembled, the gasket 30 is clamped or compressed between the collar 22 and the vacuum insulated receptacle 12. Thus the flange 28 seals against the upper gasket surface 33, while the top edge 16 of the receptacle 12 seals against the lower gasket surface 32. The engagement between the cylindrical outer surface 31 of the gasket and the cylindrical element 25 of the collar maintains the gasket and the receptacle 12 in centered relation with respect to the protective casing 18.

When the vacuum bottle 11 is tilted, its fluid contents will pour smoothly over the arching flange 28 and the outwardly projecting pouring lip 26. Due to the outwardly flaring shape of flanges 27 and 28, the stream of fluid will become completely disengaged from the vacuum bottle at the pouring lip 26, without having any substantial tendency to run down the side of the vacuum bottle. Likewise, there will be little or no tendency for the fluid to drip down onto the side of the collar 22 when the vacuum bottle 22 is erected into its upright position.

Since the inner edge portion 29 of the collar 22 and the top edge portion 16 of the vacuum insulated liner are tightly sealed against opposite sides of the thin inner portion 34 of the gasket, the fluid contents of the vacuum bottle cannot flow under the pouring lip flange 28 or under the gasket 30. Accordingly, the vacuum bottle can be cleaned simply by wiping the inner edge 34 of the gasket without any necessity for disassembling the vacuum bottle. The cleaning of the inner portion 34 of the gasket 30 is easily accomplished since the inner gasket portion is substantially flush with the inner edge portion 29 of the pouring lip flange 28.

It will be recognized that the pouring lip construction of the exemplary vacuum bottle is extremely low in cost since it is formed integrally with the collar 22. The pouring lip construction requires a minimum of material and may be formed in a few simple operations. The gasket 30 may readily be molded in the desired form. Moreover, the gasket requires very little material. Accordingly, the pouring lip construction adds very little to the cost of the vacuum bottle.

Fig. 4 illustrates a modified form of vacuum bottle 35 which is the same as the one shown in Figs. 1–3, except that the vacuum bottle of Fig. 4 is wide mouthed while the bottle of Figs. 1–3 is of narrow mouthed form. Accordingly, the same reference characters have been applied to Fig. 4 as to Figs. 1–3 with the addition of the suffix "a." In this way, the description directed above to Figs. 1–3 may be applied to Fig. 4.

Various other modifications, alternative constructions and equivalents may be employed without departing from the true spirit and scope of the invention as exemplified in the foregoing description and defined in the following claims.

I claim:
1. In a vacuum bottle, the combination comprising a double walled vacuum insulated receptacle having a mouth with a rounded annular top edge therearound, a protective jacket receiving said receptacle and having an upper portion around the upper end thereof, said upper portion comprising a thin annular metal wall with a generally cylindrical element adjacent its upper end, an integral outwardly flaring flange element surmounting said cylindrical element, an integral inwardly and downwardly extending annular flange surmounting said outwardly flaring flange element, said flange and said flange element being joined in a sharp annular fold defining an outwardly projecting generally horizontal pouring lip, said pouring lip projecting sharply outwardly from said cylindrical element with a substantial overhang and with substantial annular clear space immediately under said lip, said inwardly extending annular flange having an inner terminal edge closely overlying said top edge on said receptacle, said annular flange being upwardly convex and arching smoothly upwardly and outwardly between said inner edge and said pouring lip, and an annular resilient rubberlike sealing gasket seated between said collar portion and said receptacle, said gasket having a generally cylindrical outer surface snugly received within said generally cylindrical element on said collar, said gasket having an arching top suface fitting against and conforming in shape to the underside of said arching inwardly extending flange on said upper portion of said jacket, said gasket having a concavely curved lower surface seated around and conforming in shape to said rounded top edge of said receptacle, said gasket tapering inwardly to a relatively thin annular inner edge portion received between said inner edge of said upper portion of said jacket and said top edge of said receptacle.

2. In a vacuum bottle, the combination comprising a double walled vacuum insulated receptacle having a mouth with an annular top edge portion therearound, a protective jacket receiving said receptacle and having an upper portion around the upper end thereof, said upper portion comprising a thin annular metal wall with a generally cylindrical element adjacent its upper end, an integral outwardly flaring flange element surmounting said cylindrical element, an integral inwardly and downwardly extending annular flange surmounting said outwardly flaring flange element, said flange and said flange element being joined in a sharp annular fold defining an outwardly projecting substantially horizontal pouring lip, said pouring lip projecting sharply outwardly from said cylindrical element with a substantial overhang and with substantial annular clear space immediately under said lip, said inwardly extending annular flange having an inner terminal edge closely overlying said top edge on said receptacle, and an annular resilient sealing gasket seated between said upper portion of said jacket and said top edge portion of said receptacle, said gasket having an annular inner edge portion received between said inner edge of said upper portion of said jacket and said top edge portion of said receptacle, said gasket having a depending annular portion closely received between said receptacle and said cylindrical element on said jacket to center said receptacle therein.

3. In a vacuum bottle, the combination comprising a vacuum insulated receptacle having a mouth with an annular top edge therearound, a protective jacket receiving said receptacle and having an annular upper end portion with a side wall surmounted by an integral outwardly extending flange element, an integral inwardly and downwardly extending annular flange surmounting said outwardly extending flange element, said flange and said flange element being joined in a sharp annular fold defining an outwardly projecting pouring lip, said pouring lip projecting sharply outwardly from said side wall with a substantial overhang and with substantial annular clear space immediately under said lip, said inwardly extending annular flange having an inner terminal edge closely overlying said top edge on said receptacle, and an annular resilient rubberlike sealing gasket seated between said upper end portion and said receptacle and having an annular inner portion received between said inner edge of said flange and said top edge of said receptacle, said gasket having a depending annular portion fitting between said receptacle and said side wall of said jacket to center said receptacle therein.

References Cited in the file of this patent

UNITED STATES PATENTS

| 1,448,996 | Donath | Mar. 20, 1923 |
| 2,324,253 | Anderson | July 13, 1943 |
| 2,585,125 | Hoffman | Feb. 12, 1952 |

FOREIGN PATENTS

| 11 | Great Britain | 1910 |
| 315,353 | Germany | Nov. 4, 1919 |
| 407,623 | Germany | Dec. 29, 1924 |
| 480,943 | Germany | Aug. 10, 1929 |
| 195,158 | Switzerland | Apr. 1, 1938 |